United States Patent
Tipton

(10) Patent No.: US 6,382,225 B1
(45) Date of Patent: May 7, 2002

(54) FUEL TRANSFER PUMP AND CONTROL

(75) Inventor: Larry J. Tipton, Kokomo, IN (US)

(73) Assignee: Federal-Mogul World Wide, Inc. (JP)

( * ) Notice: Subject to any disclaimer, the term of this patent is extended or adjusted under 35 U.S.C. 154(b) by 0 days.

(21) Appl. No.: 09/647,645

(22) PCT Filed: Sep. 13, 2000

(86) PCT No.: PCT/US00/25017

§ 371 Date: Oct. 3, 2000

§ 102(e) Date: Oct. 3, 2000

(87) PCT Pub. No.: WO01/21429

PCT Pub. Date: Mar. 29, 2001

Related U.S. Application Data

(60) Provisional application No. 60/155,051, filed on Sep. 21, 1999.

(51) Int. Cl.[7] .............................................. B60K 15/07
(52) U.S. Cl. .......................... 137/1; 137/571; 137/580; 123/514
(58) Field of Search ................................ 137/580, 571; 137/1; 123/514

(56) References Cited

U.S. PATENT DOCUMENTS

| | | | |
|---|---|---|---|
| 3,724,481 A | 4/1973 | Schützenauer | 137/101.25 |
| 4,874,013 A * | 10/1989 | Hack, Jr. | 137/571 |
| 4,930,537 A | 6/1990 | Farmer | 137/571 |
| 5,197,433 A | 3/1993 | Hodgkins | 123/514 |
| 5,197,444 A * | 3/1993 | Lang et al. | 137/571 |
| 5,360,034 A | 11/1994 | Der Manuelian | 137/571 |
| 5,417,239 A | 5/1995 | Ford | 137/571 |
| 5,792,343 A * | 8/1998 | Fujita et al. | 137/571 |
| 5,960,809 A | 10/1999 | Keller | 137/12 |

FOREIGN PATENT DOCUMENTS

| | | |
|---|---|---|
| DE | 42 27 121 A | 2/1994 |
| FR | 2 640 556 A | 6/1990 |

* cited by examiner

Primary Examiner—A. Michael Chambers
(74) Attorney, Agent, or Firm—Baker & Daniels

(57) ABSTRACT

A fuel storage and distribution system for heavy and medium duty trucks which include dual fuel tanks (24, 26). An electric transfer pump (22) transfers fluid from the tank with the greatest volume to the tank with the lowest volume. Fuel level sensors (18, 20) measure the fluid levels in the fuel tanks (24, 26) and provide inputs to the electric transfer pump (22). Fuel may be transferred in either direction between the two fuel tanks.

4 Claims, 2 Drawing Sheets

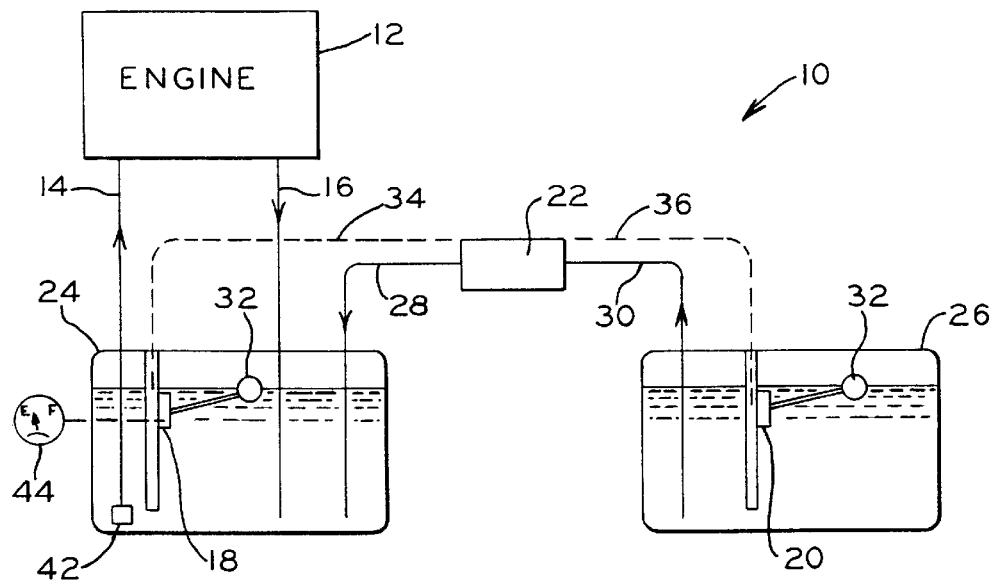
FIG_1
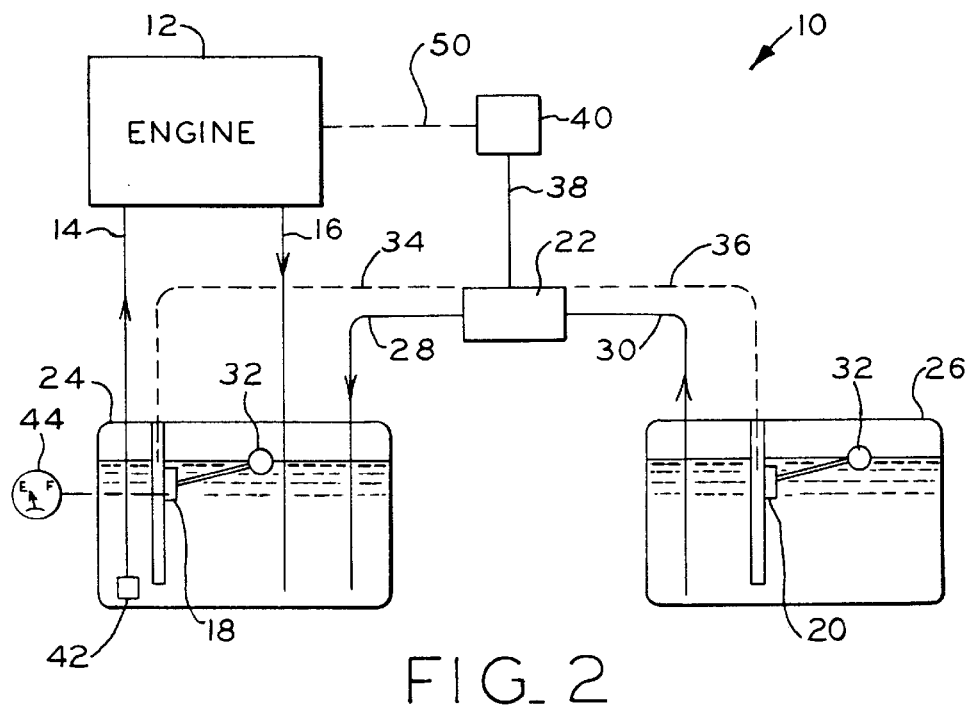
FIG_2

FUEL TRANSFER PUMP AND CONTROL

This appln is a 371 of PCT/US00/25017 filed Sep. 13, 2000 which claims benefit of Prov. No. 60/155,051 filed Sep. 21, 1999.

BACKGROUND OF THE INVENTION

1. Field of the Invention

The present invention relates to fuel transfer from a plurality of fuel tanks to the engine of a vehicle, and more particularly, to a method and apparatus for maintaining substantially equivalent fuel levels within the plurality of fuel tanks.

2. Description of the Related Art

Vehicles such as, for example, heavy and medium duty trucks commonly employ a dual tank configuration providing a large fuel capacity. The two tanks are positioned on opposing sides of the truck. Such dual tank configurations are troublesome to fill. Either two fuel dispensers must be used (one on either side of the truck), or the truck must be turned around so that both fuel tanks may be filled using a single fuel dispenser.

As is known in the art of internal combustion powered vehicles, fuel pumps remove more fuel from fuel tanks than is utilized in the engine so as to cool the fuel injector pump. The surplus fuel which is not used by the engine is constantly returned to the fuel tank. In the dual tank configurations currently utilized with heavy and medium duty trucks, fuel is drawn from and returned to both fuel tanks simultaneously. These systems do not draw fuel evenly from both tanks nor do they return fuel evenly to both tanks. Uneven fuel draw and return can be attributed to many factors affecting fluid flow, including pressure differentials and physical attributes of the fluid distribution system including, but not limited to partial blockage of distribution piping. Spillage may occur if fuel is drawn primarily from one of the two tanks and fuel is returned primarily to the other of the two tanks.

Roads and parking areas are generally formed with a crowned configuration leading to one of the two fuel tanks being lower relative to the other. Fuel is more easily drawn from the higher tank and consequently the lower tank has less fuel drawn from it. This exacerbates the problem of uneven fuel draw and the consequent spillage which can occur.

Uneven fuel draw and return additionally causes balance problems when one of the two fuel tanks contains significantly more fuel than the other. Hydrocarbon fuel typically weighs approximately 6 lbs. per gallon and the fuel tanks in question generally have a capacity of approximately 100 gallons. The substantial weight differential caused by an uneven amount of fuel in the two tanks can cause maintenance and other problems for the truck operator including, for example, uneven tire wear. An additional problem associated with the dual tank configuration occurs when one of the two tanks is emptied and air is drawn into the engine from the fuel supply line connected to the empty tank. When air is drawn into the engine, engine stall is experienced and restarting the engine is problematic.

SUMMARY OF THE INVENTION

The present invention is directed to improve upon the aforementioned fuel storage and distribution systems for heavy and medium duty trucks wherein it is desired to utilize a dual tank configuration in which the fuel levels in both tanks remain substantially equal. The present invention provides an electric transfer pump configured to be in fluid communication with both fuel tanks. Fluid level sensors measure the fluid level in both fuel tanks and are communicatively connected to the electric transfer pump. When the fluid level in one of the tanks reaches a predetermined lower level than in the other tank, the electric transfer pump distributes fuel from the tank having the greater fuel volume to the other tank. The electric transfer pump may be configured so that fuel can be transferred in either direction between the two fuel tanks.

In one form of the current invention, the first of the two fuel tanks is in direct fluid communication with the engine whereby fuel is supplied to the engine from the first tank and excess fuel returning from the engine is returned to the first tank. Fuel level sensors are operatively connected to both fuel tanks. Fluid level measurements from the two fuel level sensors are communicated to an electric transfer pump. The electric transfer pump includes a computational/control device such as a microprocessor or a programmable logic controller which evaluates the two fuel level signals and determines whether fuel should be transferred from the second fuel tank to the first fuel tank. Fuel is transferred when the fuel level in the first fuel tank reaches a predetermined lower level than the fuel level in the second fuel tank.

The computational/control device can be contained within the electric transfer pump as described above or may be placed in the standard truck circuit board which controls other truck electric operations. The electric transfer pump may, for example, take the form of a pulse width modulated solenoid pump or a DC motor driven positive displacement pump.

An advantage of the present invention is the ability to prevent fuel spillage in a dual fuel tank configuration by eliminating the possibility that more fuel is returned to a fuel tank than is taken from the fuel tank.

Another advantage of the present invention is the ability to maintain substantially equal fuel volumes within a dual tank configuration and thus eliminate balance problems associated with unequal fuel volumes.

A further advantage of the present invention is the ability to eliminate engine stall occurring as a result of air being drawn from an empty fuel tank.

Yet another advantage of the present invention is the ability to utilize the electric transfer pump to transfer fuel provided to one fuel tank to the other fuel tank while fueling so that the problems associated with filling a pair of fuel tanks on opposing sides of a vehicle are not experienced.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a schematic representation of an embodiment of the fuel distribution system of the present invention;

FIG. 2 is a schematic representation of another embodiment of the fuel distribution system of the present invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 3:
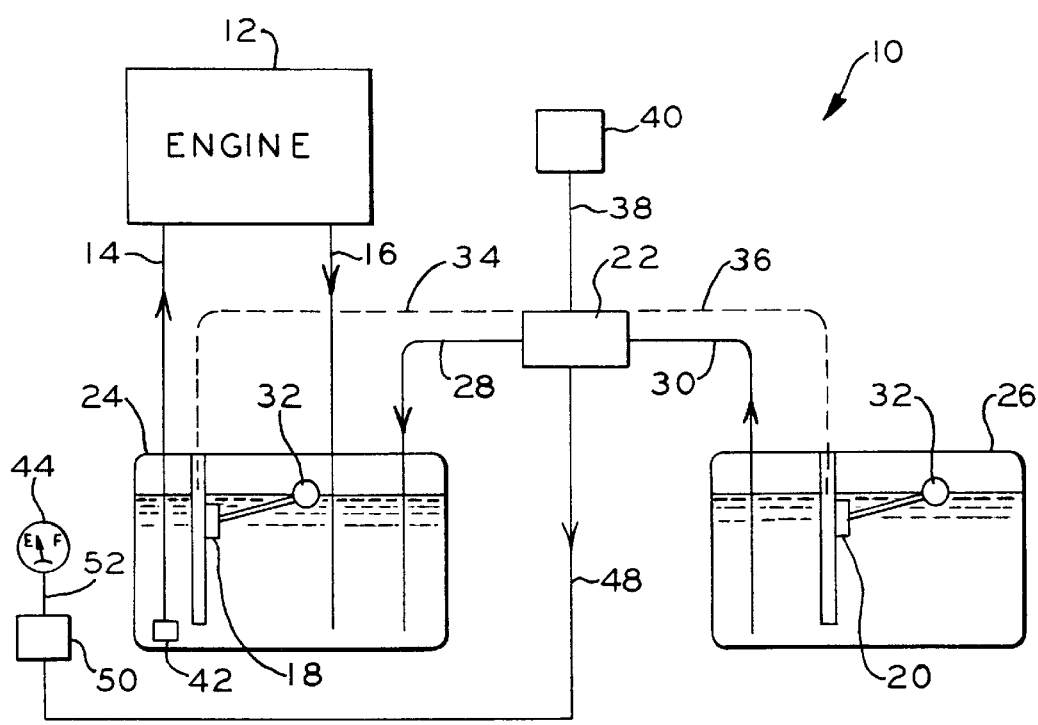
FIG. 3 is a schematic representation of yet another embodiment of the fuel distribution system of the present invention.

Referring now to the drawings and particularly to FIG. 1, there is shown fuel transfer system 10 including first tank 24, second tank 26 and pump 22. Pump 22 is in fluid communication with both first tank 24 and second tank 26 and is operative to transfer fuel from second tank 26 to first tank 24.

As depicted in FIG. 1, engine 12 is in direct fluid communication with first tank 24. Pump 42 is located within first tank 24 and is in direct fluid communication with supply line 14. Supply line 14 is in direct fluid communication with engine 12 and is operable to supply fuel from first tank 24 to engine 12 at the required rate. Return line 16 is in fluid communication with both engine 12 and first tank 24 and is operative to return excess fuel from engine 12 to first tank 24.

First fuel level sensor 18 is located within first tank 24 and includes float 32. Float 32 remains above the fuel surface in first tank 24 and provides a resistance value to first fuel level sensor 18. First fuel level sensor 18 is operable to utilize the resistance value from float 32 to determine the amount of fuel in first tank 24. First fuel level sensor 18 is communicatively connected to fuel gauge 44 and to transfer pump 22. Fuel gauge 44 is positioned on the truck dash or other convenient location where the driver may monitor fuel gauge 44.

Second fuel level sensor 20 is similarly located within second tank 26 and includes float 32. Second fuel level sensor 20 operates to determine the amount of fuel in second tank 26 as described above with reference to first fuel level sensor 18. Second fuel level sensor 20 is communicatively connected to transfer pump 22. First and second fuel level sensors 18, 20 can be float-type sensors as depicted in FIGS. 1 and 2 or can be any of the many pressure sensors known in the art.

First and second fuel level sensors 18, 20 are communicatively connected to pump 22 via first communication line 34 and second communication line 36, respectively. Pump 22 is in fluid communication with first tank 24 and second tank 26 by way of first transfer line 28 and second transfer line 30, respectively. FIG. 2 depicts an embodiment of the current invention wherein transfer pump 22 is further communicatively connected to controller 40 wherein controller 40 is located remotely from transfer pump 22. Controller 40 may comprise an output driver added to the existing circuit board. Controller 40 is communicatively connected to first and second fuel level sensors 18, 20. This communicative connectivity may be achieved through pump 22, or through direct connection of controller 40 to both first and second fuel level sensors 18, 20 (not shown).

Additionally an electrical connection 46 can be made between the engine and controller 40 to provide an input to controller 40 indicating that the engine is either running or not running. The signal provided on line 46 could be an indication of the rpms of the engine, oil pressure or the like. Thus a signal provided on line 46 from the engine to controller 40 could cause controller 40 to either enable or disable pump 22 depending on the transmitted signal. For instance, pump 22 should not operate when the engine is not running to avoid pumping fuel on the ground in a worst case scenario such as in case of a crash of the vehicle.

FIG. 3 depicts an embodiment of the current invention wherein pump 22 is directly communicatively connected to stepper motor 50 via fourth communication line 48. Stepper motor 50 is further mechanically coupled to fuel gauge 44 via step connection 50. In this embodiment, fuel gauge 44 is not connected to first fuel level sensor 18. Stepper motor 50 actuates fuel gauge 44 in response to fuel transfer via pump 22. Stepper motor 50 may be integral with fuel gauge 44.

First tank 24 and second tank 26 can contain baffles (not shown) which are operative to reduce the sloshing of fuel while the vehicle is in motion. However, baffles do not completely eliminate fuel slosh and therefore electronic dampening is provided. Electronic dampening is provided in the current invention by utilizing average fuel level measurements from first and second fuel level sensors 18, 20. A preset time frame over which fuel level values are averaged is entered into the controller. Average fuel levels over this preset time frame are then compared and utilized to control pump 22. In this way excessively high or excessively low fuel values due to slosh will not cause actuation of pump 22 and lead to unnecessary transfer of fuel.

In operation, the controller of the current invention works to maintain a substantially equivalent fuel level in first tank 24 and second tank 26. As the engine uses fuel, the fuel level in first tank 24 decreases. As the fuel level in first tank 24 drops below the fuel level in second tank 26 by a predetermined amount, the controller signals transfer pump 22 to transfer a predetermined amount of fuel from second tank 26 to first tank 24. In one embodiment, the controller does not deliver a predetermined amount of fuel from second tank 26 to first tank 24, but rather actuates transfer pump 22 until the fuel levels in first tank 24 and second tank 26 are substantially equal. The fuel level in first tank 24 is sensed by first fuel sensor 18 and is thereafter communicated to a controller located within transfer pump 22 or to a remotely located controller 40. The fuel level of second tank 26 is similarly sensed by second fuel level sensor 20 and communicated to the controller. The controller evaluates the thusly communicated fuel level values and actuates pump 22 as necessary. Pump 22 has sufficient flow resistance to prohibit siphoning from second tank 26 to first tank 24. An internal check valve (not shown) prevents siphoning from first tank 24 to second tank 26.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of providing fuel from a pair of fuel tanks to an engine, comprising:

placing the first of the pair of fuel tanks in direct fluid communication with the engine;

placing the second of the pair of fuel tanks in fluid communication with the first of the pair of fuel tanks;

monitoring the amount of fuel in both the first and the second fuel tanks;

computing the total amount of fuel in both said first and second tanks;

indicating the amount of fuel in both said first and second tanks; and transferring fuel from the second fuel tank to the first fuel tank when the amount of fuel in the first fuel tank drops below the amount of fuel in the second fuel tank by a predetermined amount.

2. The transfer apparatus of claim 1 wherein said controller is further operatively connected to an engine, whereby said pump is deactivated when said engine is not operating.

3. The method according to claim 1 including the step of preventing the transfer fuel when the said engine is not operating.

4. A fuel transfer apparatus for providing fuel to an engine, comprising:

a first fuel tank;

a fuel supply line, said fuel supply line in direct fluid communication with said first fuel tank and the engine;

a fuel return line, said fuel return line in direct fluid communication with the engine and said first fuel tank;

a first fuel level sensor operatively associated with said first tank;

a second fuel tank;

a second fuel level sensor operatively associated with said second tank;

a pump in direct fluid communication with said first fuel tank and said second fuel tank, said pump operative to transfer fuel from said second fuel tank to said first fuel tank;

a fuel gauge; and a controller operatively connected to said first and second fuel level sensors and said fuel gauge whereby the total amount of fuel in said first and second tanks is computed by said controller and is indicated by said gauge.

* * * * *